(12) United States Patent
Shiraishi et al.

(10) Patent No.: US 6,700,749 B2
(45) Date of Patent: Mar. 2, 2004

(54) PRECISE POSITIONING ACTUATOR FOR HEAD ELEMENT, HEAD GIMBAL ASSEMBLY WITH THE ACTUATOR, DISK DRIVE APPARATUS WITH THE HEAD GIMBAL ASSEMBLY, MANUFACTURING METHOD OF ACTUATOR AND MANUFACTURING METHOD OF HEAD GIMBAL ASSEMBLY

(75) Inventors: Masashi Shiraishi, Tokyo (JP); Tamon Kasajima, Tokyo (JP)

(73) Assignee: TDK Corporation, Tokyo (JP)

( * ) Notice: Subject to any disclaimer, the term of this patent is extended or adjusted under 35 U.S.C. 154(b) by 170 days.

(21) Appl. No.: 09/972,939

(22) Filed: Oct. 10, 2001

(65) Prior Publication Data

US 2002/0051326 A1 May 2, 2002

(30) Foreign Application Priority Data

Oct. 31, 2000 (JP) ........................................ 2000/332255

(51) Int. Cl.⁷ .............................................. G11B 21/24
(52) U.S. Cl. .................................................... 360/294.4
(58) Field of Search ....................................... 360/294.4

(56) References Cited

U.S. PATENT DOCUMENTS

| 5,745,319 | A | | 4/1998 | Takekado et al. |
| 6,362,939 | B1 | * | 3/2002 | Crane et al. ............. 360/294.5 |
| 6,414,823 | B1 | * | 7/2002 | Crane et al. ............. 360/294.5 |
| 6,538,836 | B1 | * | 3/2003 | Dunfield et al. ............... 360/75 |

FOREIGN PATENT DOCUMENTS

JP 8-180623 7/1996

* cited by examiner

*Primary Examiner*—A. J. Heinz
*Assistant Examiner*—Mark Blouin
(74) *Attorney, Agent, or Firm*—Oblon, Spivak, McClelland, Maier & Neustadt, P.C.

(57) ABSTRACT

A precise positioning actuator to be fixed to a head slider provided with at least one head element and to a support, for precisely positioning the at least one head element, includes a pair of movable arms formed by a metal plate. These movable arms are capable of displacing in response to a drive signal applied to the actuator along a direction crossing a plate plane of the movable arms, and catch the head slider in a space between them.

28 Claims, 7 Drawing Sheets

PRECISE POSITIONING ACTUATOR FOR HEAD ELEMENT, HEAD GIMBAL ASSEMBLY WITH THE ACTUATOR, DISK DRIVE APPARATUS WITH THE HEAD GIMBAL ASSEMBLY, MANUFACTURING METHOD OF ACTUATOR AND MANUFACTURING METHOD OF HEAD GIMBAL ASSEMBLY

FIELD OF THE INVENTION

The present invention relates to a precise positioning actuator for a head element such as a thin-film magnetic head element or an optical head element, to a head gimbal assembly (HGA) with the actuator, to a disk drive apparatus with the HGA, to a manufacturing method of the actuator and to a manufacturing method of the HGA.

DESCRIPTION OF THE RELATED ART

In a magnetic disk drive apparatus, thin-film magnetic head elements for writing magnetic information into and/or reading magnetic information from magnetic disks are in general formed on magnetic head sliders flying in operation above the rotating magnetic disks. The sliders are supported at top end sections of suspensions of HGAs, respectively.

Recently, recording and reproducing density along the radial direction or along the track width direction in the magnetic disk (track density) rapidly increase to satisfy the requirement for ever increasing data storage capacities and densities in today's magnetic disk drive apparatus. For advancing the track density, the position control of the magnetic head element with respect to the track in the magnetic disk by a voice coil motor (VCM) only could not present enough accuracy.

In order to solve this problem, an additional actuator mechanism is mounted at a position nearer to the magnetic head slider than the VCM so as to perform fine precise positioning that cannot be achieved by the VCM only. The techniques for achieving precise positioning of the magnetic head are described in for example U.S. Pat. No. 5,745,319 and Japanese patent publication No. 08180623 A.

As for the precise positioning actuator, there are various kinds of actuators such as a load beam structure actuator and a piggy-back structure actuator.

The load beam structure actuator is formed by mounting two PZT elements on a load beam of a suspension. These PZT elements are driven to assist each other so as to displace the load beam and thus a magnetic head slider mounted on the suspension is minutely displaced.

The piggy-back structure actuator is formed in integral by piezoelectric material of PZT in an I-character shape with one end section to be fixed to a suspension, the other end section to be fixed to a magnetic head slider and a pillar shaped movable arm connected between these end sections. By driving the PZT, the head slider is directly and minutely displaced. On the suspension, stepwise stacked are the actuator and the magnetic head slider, namely, the actuator is caught between the suspension and the slider to form a stacked cantilever structure.

However, such conventional structure actuators have following various problems:

(1) Mechanical resonance occurs at a relatively low frequency;
(2) Since the actuator as a whole consists of piezoelectric material such as PZT of a brittle material, shock resistance is very poor. Particularly, in case of the piggy-back structure actuator, since the actuator and the magnetic head slider are stacked to form a cantilever structure, a shock easily occurs with a moment and also shock resistance is extremely poor;
(3) Depending upon the size of the magnetic head slider, a travel of the magnetic head element during the precise positioning operation varies. Thus, sometimes, it is difficult to obtain enough stroke;
(4) Treatment of the actuator when assembling to form the HGA is very difficult;
(5) Particularly, in case of the piggy-back structure actuator, because of the stepwise stacked structure, a total thickness of the HGA around the magnetic head slider increases by the thickness of the actuator;
(6) Particularly, in case of the piggy-back structure actuator, because of three-dimensional and complicated attachment structure of the actuator, the handling at the time of an assembly of the HGA is very difficult and it is impossible to use a conventional HGA assembly equipment causing productivity to be very worse; and
(7) In case of the piggy-back structure actuator, in order not to interfere with the movement of the actuator, it is necessary to assemble with keeping a gap between the actuator and the magnetic head slider and also between the actuator and the suspension. However, forming of such gap will more decrease the shock resistance and it is difficult to precisely keep the gap constant. Particularly, since it is difficult to keep the suspension, the actuator and the magnetic head slider in parallel precisely, the head characteristics deteriorates.

SUMMARY OF THE INVENTION

It is therefore an object of the present invention to provide a precise positioning actuator for a head element, an HGA with the actuator, a disk drive apparatus with the HGA, a manufacturing method of the actuator and a manufacturing method of the HGA, whereby a mechanical resonance frequency can be increased.

Another object of the present invention is to provide a precise positioning actuator for a head element, an HGA with the actuator, a disk drive apparatus with the HGA, a manufacturing method of the actuator and a manufacturing method of the HGA, whereby a shock resistance can be greatly improved.

Further object of the present invention is to provide a precise positioning actuator for a head element, an HGA with the actuator, a disk drive apparatus with the HGA, a manufacturing method of the actuator and a manufacturing method of the HGA, whereby an enough stroke of the head element can be ensured.

Still further object of the present invention is to provide a precise positioning actuator for a head element, an HGA with the actuator, a disk drive apparatus with the HGA, a manufacturing method of the actuator and a manufacturing method of the HGA, whereby a productivity and also quality of the HGA can be greatly improved.

According to the present invention, a precise positioning actuator to be fixed to a head slider provided with at least one head element and to a support, for precisely positioning the at least one head element, includes a pair of movable arms formed by a metal plate. These movable arms are capable of displacing in response to a drive signal applied to the actuator along a direction crossing a plate plane of the movable arms, and catch the head slider in a space between them.

Since the movable arms are mainly made from a metal plate, the weight of the whole actuator can be reduced and thus a mechanical resonance frequency of the actuator can be increased. Also, as a basic member of the arms is formed by the metal plate that is strong and light-weighted, a shock resistance of the movable arms that are particularly weaken for the shock can be greatly improved. Due to the usage of the metal plate provided with a high mechanical strength, treatment of the actuator during assembling of the HGA becomes very easy. By using the metal plate to form the main portion of the actuator, the flexibility on a design of the actuator will improve with the shape and/or size. Thus, it is enabled to design the actuator with a sufficient stroke. Furthermore, because the metal plate can be precisely machined, accuracy in size of the actuator itself can be greatly improved.

Also, since the head slider is caught in a space between the movable arms that are capable of displacing in response to a drive signal applied thereto along a direction crossing a plate plane of the movable arms, the thickness of an HGA around the head slider does not increase even if the actuator is attached. Thus, no modifications in size of a disk drive apparatus due to the mounting of the actuator is necessary. Further, since the actuator and the head slider are not stacked to form a cantilever structure, a shock resistance can be greatly improved. Still further, since the head slider is caught in between the movable arms, the top end sections of the movable arms, which actually transfer the displacement to the head slider, can be extended to always position at the top end of the head slider. Thus, it is possible to provide a constant travel to the head slider even if its size changes, and therefore an enough stroke of the head element at the precise positioning operation can be always obtained.

It is preferred that the actuator includes a base made from a metal plate and fixed to the support, and that the movable arms extend from the base. As the base and the movable arms are made from a metal plate, the weight can be more reduced and a shock resistance can be more improved. Also, accuracy in size of the actuator itself can be greatly improved.

It is also preferred that the movable arms and the base have a structure formed by bending a single metal plate. Since the main portion of the actuator is configured by bending a single metal plate, its fabrication becomes easy and a mechanically strong actuator can be provided.

It is preferred that the movable arms have at their top end sections slider fixing sections to be fixed to side surfaces of the head slider, respectively. In this case, preferably, each of the slider fixing sections has a structure formed by bending the single metal plate inwardly.

It is also preferred that the actuator has a shape so that there exists Air gaps between the movable arms and side surfaces of the head slider except for the slider fixing sections, respectively.

It is preferred that each of the movable arms includes an arm member made of the metal plate, and a piezoelectric element formed or adhered on a side surface of the arm member. In this case, preferably, the piezoelectric element has a multilayer structure of piezoelectric material layers and of electrode layers, or a single layer structure of a piezoelectric material layer and of an electrode layer.

It is preferred that the metal plate is a stainless steel plate.

It is also preferred that the movable arms is constituted so that the head slider is linearly and laterally swayed in response to the drive signal. Since the head slider displaces namely sways with linear motion not swinging or rotational motion, more precise positioning of the head element can be expected.

It is further preferred that a spacing between the pair of movable arms is determined to a value slightly shorter than a width of the head slider to be caught.

Preferably, the at least one head element is at least one thin-film magnetic head element.

According to the present invention, also, an HGA includes a head slider provided with at least one head element, a support and aforementioned precise positioning actuator fixed to the head slider and to the support.

It is preferred that the movable arms of the actuator and the head slider are fixed by adhering.

It is also preferred that the actuator and the support are fixed by adhering or by laser welding.

According to the present invention, furthermore, a disk drive apparatus has at least one HGA mentioned above.

In addition, according to the present invention, a manufacturing method of a precise positioning actuator to be fixed to a head slider provided with at least one head element and to a support, for precisely positioning the at least one head element, includes a step of forming on a metal plate a plurality of conductor patterns connected to a plurality of piezoelectric elements, a step of cutting the metal plate into separated actuator members each including the conductor patterns and the piezoelectric elements for each actuator, and a step of bending each of the separated actuator members to form the individual actuator.

It is preferred that the forming step includes forming the plurality of piezoelectric elements and the plurality of conductor patterns by sputtering and by photolithography, or by printing and by sintering.

It is also preferred that the forming step includes forming the plurality of conductor patterns by sputtering and by photolithography or by printing and by sintering, and adhering the plurality of piezoelectric elements that are separately formed to the metal plate.

It is preferred that the cutting step includes cutting the metal plate into the separated actuator members each having a rough U-plane shape.

According to the present invention, further, a manufacturing method of an HGA includes a step of preparing a precise positioning actuator having a base formed by a metal plate and a pair of movable arms formed by a metal plate, the movable arms being extending from the base and capable of displacing in response to a drive signal applied thereto along a direction crossing a plate plane of the movable arms, a step of catching a head slider provided with at least one head element in a space between the movable arms of the actuator, and a step of fixing the base of the actuator with the caught head slider to a support.

First, the head slider is caught in a space between the movable arms of the actuator, and then the actuator with the caught head slider is fixed to the support. Since assembling of the head slider and the actuator can be carried out on the flat plate, alignment of the slider and the actuator becomes easy resulting that a higher accuracy assembling can be expected. Also, since a thermosetting adhesive with excellent curing performance although it needs a long curing time can be used, a high quality assembly of the head slider and the actuator can be obtained. Furthermore, since the assembly has a simple shape, adhesion and electrical connection of the assembly with a suspension can be performed by using a general HGA assembling equipment resulting the productivity to extremely improve and thus the manufacturing cost to reduce. In addition, due to the usage of the metal plate provided with a high mechanical strength, treatment of the actuator during assembling of the HGA becomes very easy.

Also, according to the present invention, a manufacturing method of an HGA includes a step of preparing a precise positioning actuator having a base formed by a metal plate and a pair of movable arms formed by a metal plate, the movable arms being extending from the base and capable of displacing in response to a drive signal applied thereto along a direction crossing a plate plane of the movable arms, a step of fixing the base of the actuator to a support, and a step of catching a head slider provided with at least one head element in a space between the movable arms of the actuator fixed to the support.

It is preferred that the movable arms and the base are formed by bending a single metal plate. Since the main portion of the actuator is formed by bending a single metal plate, its fabrication becomes easy and a mechanically strong actuator can be provided.

It is also preferred that the actuator is formed to have a spacing between the pair of movable arms slightly shorter than a width of the head slider to be caught, and that the catching step includes provisionally fixing the head slider between the movable arms by a pinching force of the movable arms. In this case, preferably, the catching step includes securely fixing the head slider to the movable arms by curing an adhesive after the provisional fixing.

It is preferred that the fixing step includes fixing the actuator and the support each other by adhering or by laser welding.

Further objects and advantages of the present invention will be apparent from the following description of the preferred embodiments of the invention as illustrated in the accompanying drawings.

DESCRIPTION OF THE PREFERRED EMBODIMENTS

Figure 1:
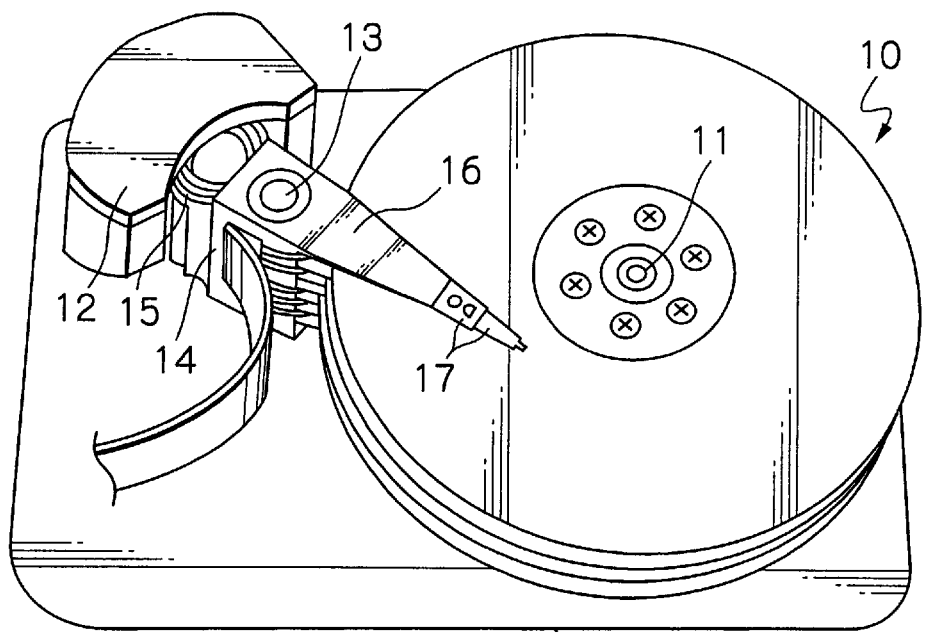
FIG. 1 is an oblique view schematically illustrating main components of a magnetic disk drive apparatus in a preferred embodiment according to the present invention.
Figure 2:
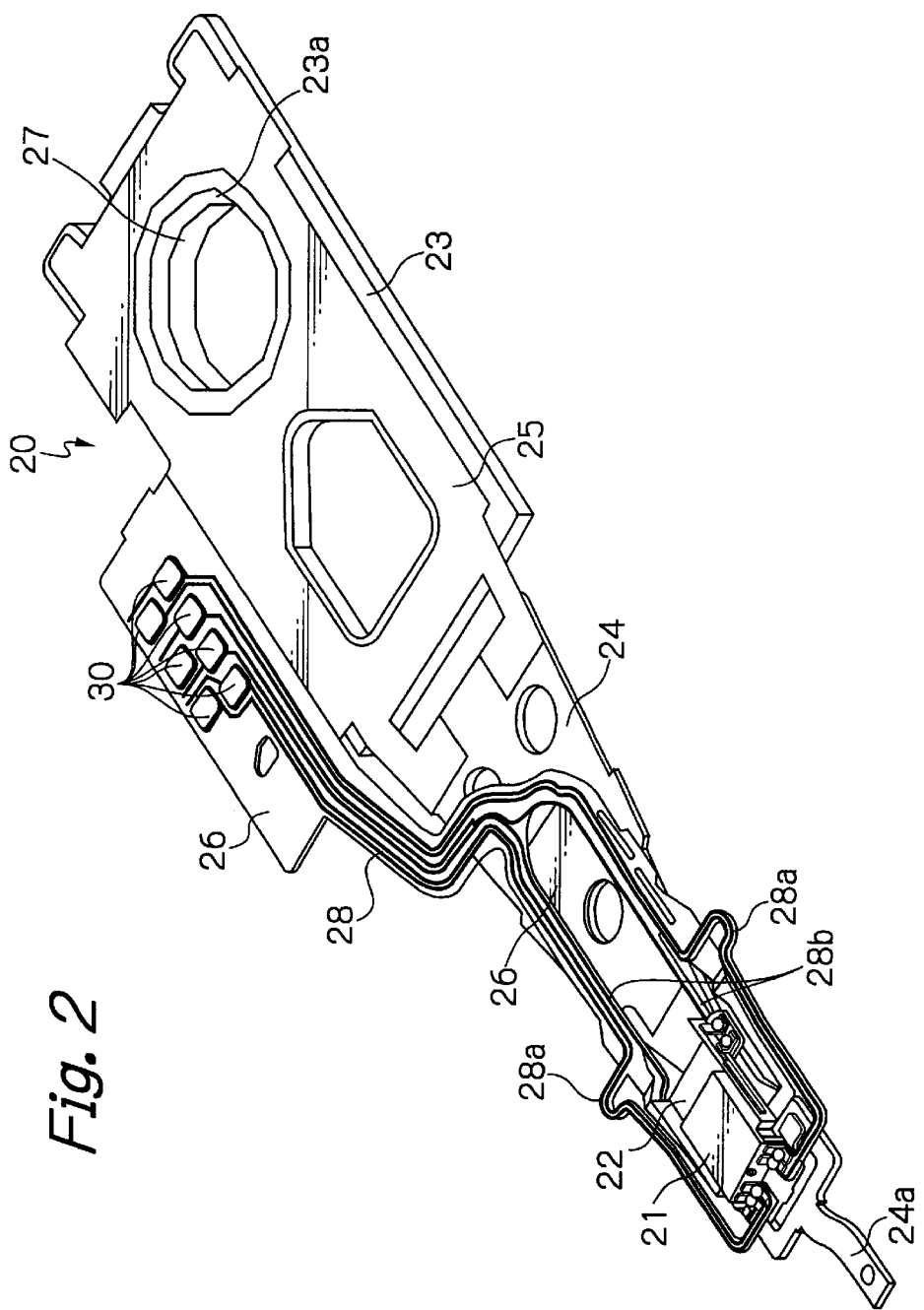
FIG. 2 is an oblique view illustrating the whole structure of an HGA in the embodiment of FIG. 1.
Figure 3:
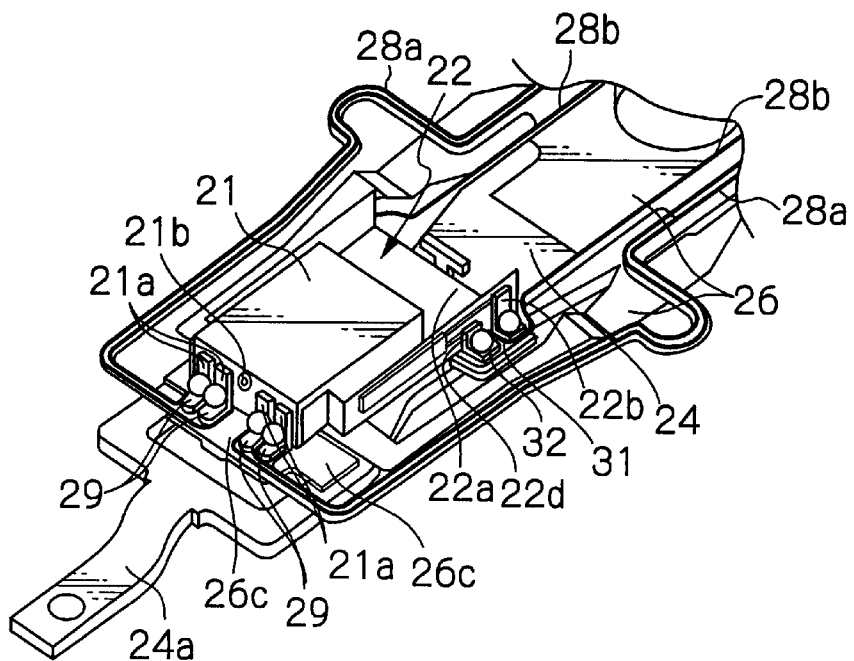
FIG. 3 is an oblique view illustrating a top end section of the HGA in the embodiment of FIG. 1.
Figure 4:
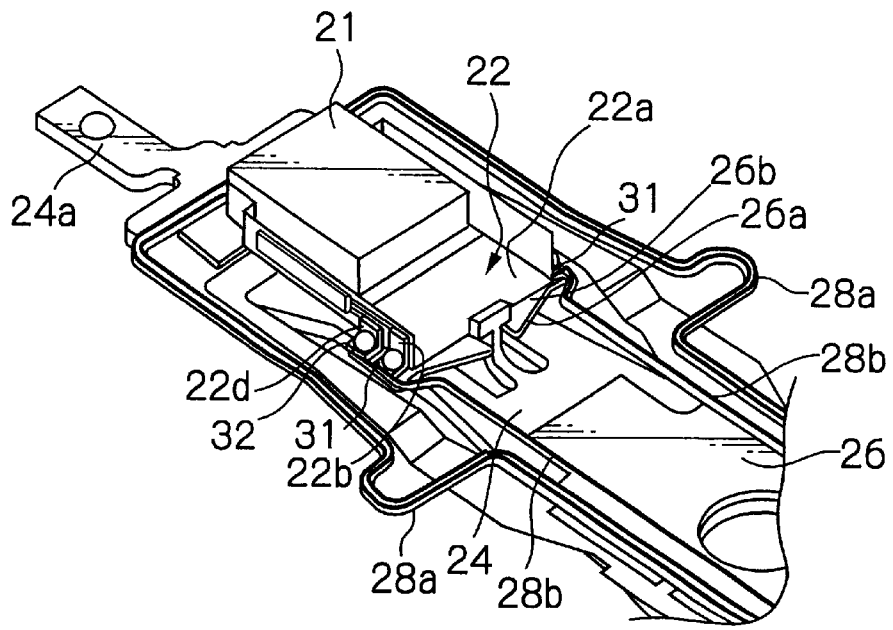
FIG. 4 is an oblique view illustrating the top end section of the HGA in the embodiment of FIG. 1, seen from different direction from that of FIG. 3.

FIG. 1 illustrates main components of a magnetic disk drive apparatus in a preferred embodiment according to the present invention, FIG. 2 illustrates the whole structure of an HGA in this embodiment, and FIGS. 3 and 4 illustrate a top end section of the HGA in this embodiment, seen from different directions with each other.

In FIG. 1, reference numeral 10 denotes a plurality of magnetic hard disks rotating around an axis 11, and 12 denotes an assembly carriage device for positioning each magnetic head slider on a track of each disk. The assembly carriage device 12 is mainly constituted by a carriage 14 capable of rotating around an axis 13 and a main actuator 15 such as for example a voice coil motor (VCM) for driving the carriage 14 to rotate.

Base sections at one ends of a plurality of drive arms 16 stacked along the axis 13 are attached to the carriage 14, and one or two HGAs 17 are mounted on a top section at the other end of each arm 16. Each of the HGAs 17 has the magnetic head slider mounted at its top end section so that the slider opposes to one surface (recording and reproducing surface) of each of the magnetic disks 10.

As shown in FIGS. 2 to 4, the HGA is assembled by fixing a fine tracking actuator 22 for precise positioning of a thin-film magnetic head element 21b to a top end section of a suspension 20. The actuator 22 holds side surfaces of the magnetic head slider 21 with the thin-film magnetic head element 21b.

The main or course actuator of VCM 15 shown in FIG. 1 is used for rotationally moving the drive arm 16 to which such HGA is attached, so as to move the whole assembly. The actuator 22 contributes the fine positioning of the HGA, which cannot be adjusted by the main or course actuator 15.

The suspension 20 is substantially formed, as shown in FIGS. 2 to 4, by first and second load beams 23 and 24, a resilient hinge 25 for coupling these first and second load beams 23 and 24 with each other, a resilient flexure 26 fixed on the second load beam 24 and the hinge 25, and a circular base plate 27 formed at an attaching section 23a of the first load beam 23.

The flexure 26 has a flexible tongue 26a depressed by a dimple (not shown) formed on the second load beam 24, at its one end section. On the tongue 26a, fixed is a base 22a of the actuator 22 via an insulation layer 26b made of for example polyimide. The flexure 26 has elasticity for supporting flexibly the magnetic head slider 21 through the actuator 22 by this tongue 26a. The flexure 26 is made of in this embodiment a stainless steel plate (for example SJS304TA) with a thickness of about 20 μm. The flexure 26 is fixed with the second load beam 24 and with the hinge 25 at a plurality of points by pinpoint welding.

The hinge 25 has elasticity providing, to the second load beam 24, a force for pressing the magnetic head slider 21 toward the direction of a magnetic disk surface through the actuator 22 in operation. The hinge 25 is made of in this embodiment a stainless steel plate with a thickness of about 40 μm.

The first load beam 23 is made of in this embodiment a stainless steel plate with a thickness of about 100 μm, and supports the whole surface of the hinge 25. The fixing of the first load beam 23 with the hinge 25 is performed by pinpoint welding at a plurality of points.

The second load beam 24 is also made of in this embodiment a stainless steel plate with a thickness of about 100 μm, and fixed to the hinge 25 at its rear end section. The fixing of the second load beam 24 with the hinge 25 is performed also by pinpoint welding at a plurality of points. At a top end of this second load beam 24, formed is a lift-tab 24a for separating the HGA from the magnetic-disk surface during out of operation is prepared.

The base plate 27 to be attached to the drive arm 16 shown in FIG. 1 is made of in this embodiment a stainless steel or iron plate with a thickness of about 150 μm. This base plate 27 is fixed to the attaching section 23a of the first load beam 23 by welding.

On the flexure 26, a flexible conductor member 28 including a plurality of trace conductors of a thin-film multilayered pattern is formed or disposed. The conductor member 28 is formed by a known method similar to the patterning method of forming a printed circuit board on a thin metal plate such as a flexible printed circuit (FPC). For example, the member 28 is formed by sequentially depositing a first insulation material layer made of a resin such as polyimide with a thickness of about 5 μm, a patterned Cu layer (trace conductor layer) with a thickness of about 4 μm, and a second insulation material layer made of a resin such as polyimide with a thickness of about 5 μm on the flexure 26 in this order. Within the regions of the connection pads formed for connecting with the actuator, the magnetic head element 21b and an external circuit, an Au layer is deposited on the Cu layer and there is no second insulation material layer on the Au layer.

In this embodiment, the conductor member 28 consists of a first conductor member 28a with two trace conductors connected to the magnetic head element 21b for one side, thus four trace conductors for both sides, and a second conductor member 28b with a trace conductor connected to the actuator 22 for one side, thus two trace conductors for both sides.

One ends of the trace conductors of the first conductor member 28a are electrically connected to head element connection pads 29 formed on an individually separated and freely movable section 26c of the flexure 26. To the connection pads 29, terminal electrodes 21a of the magnetic head slider 21 are ball-bonded by Au bonding, wire bonding or stitch bonding. The other ends of the trace conductors of the first conductor member 28a are electrically connected to external circuit connection pads 30 used for connection with an external circuit.

One ends of trace conductors of the second conductor member 28b are electrically connected to actuator connection pads 31 formed on an insulation layer 26b on the tongue 26a of the flexure 26. The connection pads 31 are connected to A channel signal terminals 22b and B channel signal terminals (not shown) of the actuator 22, respectively. The other ends of trace conductors of the second conductor member 28b are electrically connected to the external circuit connection pads 30.

A structure of the HGA according to the present invention is not limited to the aforementioned structure. Furthermore, although it is not shown, a head drive IC chip may be mounted on a middle of the suspension 20.

Figure 5:
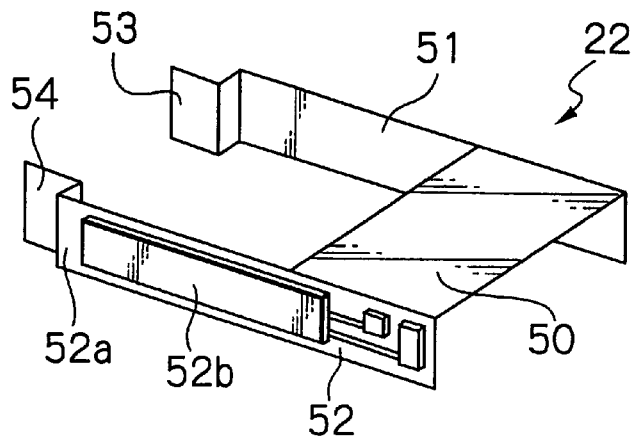
FIG. 5 is an oblique view illustrating a structure of an actuator in the embodiment of FIG. 1.
Figure 6:
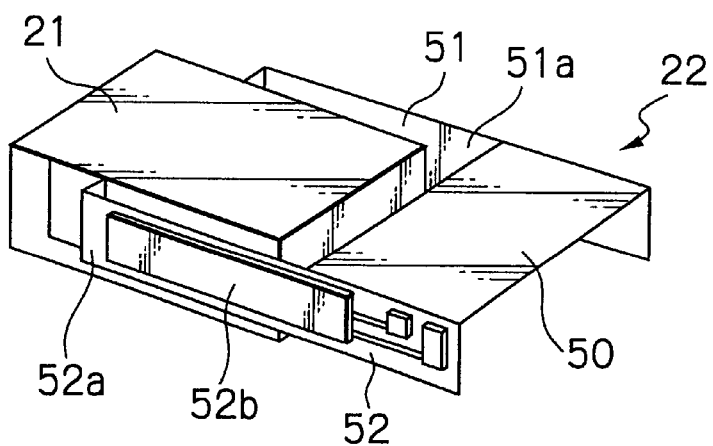
FIG. 6 is an oblique view illustrating a configuration of the actuator shown in FIG. 5, on which a magnetic head slider is attached.
Figure 7:
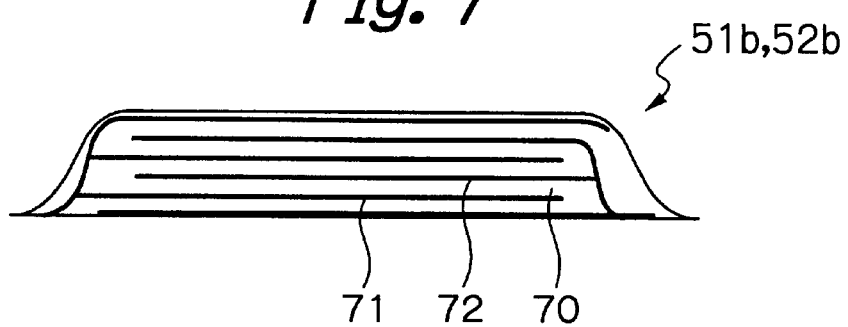
FIG. 7 is a sectional view illustrating a structure of a piezoelectric element section of the actuator shown in FIG. 5.

FIG. 5 illustrates a structure of the actuator 22 in the embodiment of FIG. 1, FIG. 6 illustrates a configuration of the actuator 22 with the magnetic head slider attached thereon, and FIG. 7 illustrates a structure of a piezoelectric element section of the actuator 22. It should be noted that FIGS. 5 and 6 are indicated in a turned over state of the actuator shown in FIGS. 2 to 4, and thus in FIGS. 5 and 6, the upper side surface of the base of the actuator will be fixed to the suspension.

As will be noted from FIGS. 5 and 6, the main portion of the actuator 22 is formed by cutting a metal plate into individual actuator members each having a rough U-plane shape and by bending each of them in a three-dimensional shape. Namely, the actuator member is bent at both side ends of its plane base 50 (22a) toward almost perpendicular direction. A pair of movable arms 51 and 52 that are kept in almost perpendicular to the base 50 extend frontward from these bent areas. The upper surface, in the figures, of the base 50 is fixed to the suspension. The movable arms 51 and 52 are formed in a plane shape parallel to the side surfaces of the magnetic head slider 21.

At top end sections of the movable arms 51 and 52, formed respectively are slider fixing sections 53 and 54 to be fixed to the side surfaces of the magnetic head slider 21 by bending the arms inwardly in a crank arm shape. The spacing between the slider fixing sections 53 and 54 is determined to a value slightly shorter than the width of the magnetic head slider to be caught therein. A height of the actuator 22 is determined to a value equal to or smaller than that of the magnetic head slider to be held so that the total height or thickness of the HGA will not increase due to the mounting of the actuator. Conversely, by increasing the height of the actuator 22 up to the thickness of the magnetic head slider to be held, strength of the actuator itself can be increased without increasing the total thickness of the HGA.

The slider fixing sections 53 and 54 are bent inwardly to project toward the side surfaces of the magnetic head slider 21, so that only these sections 53 and 54 are attached to the side surfaces of the magnetic head slider 21 and that there exists air gaps between the remaining sections of the movable arms 51 and 52 and the side surfaces of the magnetic head slider 21.

The movable arms 51 and 52 consist of arm members 51a and 52a and piezoelectric elements 51b and 52b formed on side surfaces of the arm members 51a and 52a, respectively.

The base 50 and the arm members 51a and 52a of the actuator 22 are united and formed by bending an elastic single metal plate such as a stainless steel plate for example. Since the main sections of the actuator are made of the metal plate, a weight of the actuator decreases and also a shock resistance of the actuator itself increases. Instead of a steel alloy spring plate such as the stainless steel plate, a resilient plate spring member for example a carbon steel spring plate, a copper alloy spring plate such as copper titanium plate, a phosphor bronze plate or a beryllium copper plate, or a titanium plate may be used. In case that the piezoelectric elements 51b and 52b are formed by printing and sintering, it is necessary to use a high heat resistance metal plate.

Each of the piezoelectric elements 51b and 52b has, as shown in FIG. 7, a multilayer structure of alternately laminating piezoelectric material layers 70, signal electrode layers 71 and ground (common) electrode layers 72. By applying voltage across the signal electrode layers 71 and the ground (common) layers 72, the piezoelectric material layers 70 expand and contract. The piezoelectric material layer 70 is made of material that expands and contracts by reverse piezoelectric effect or by electrostrictive effect. The signal electrode layers 71 are electrically connected to the A channel signal terminal 22b shown in FIGS. 3 and 4 or the B channel signal terminal (not shown), and the ground (common) electrode layers 72 are electrically connected to a ground (common) terminal 22d or a ground (common) terminal (not shown).

In case that the layers 70 are made of piezoelectric material such as PZT (Lead Zirconate Titanate Oxidization), these piezoelectric material layers are in general polarized so as to improve their displacement performance. The polarized direction is the lamination direction of the piezoelectric material layers 70. When voltage is applied across the electrode layers and the direction of the produced electrical field is the same as the polarized direction, the piezoelectric material layer between the electrode layers expands in its lamination direction (piezoelectric longitudinal effect) and contracts in its in-plane direction (piezoelectric lateral effect). Contrary to this, when the direction of the produced electrical field is in inverse as the polarized direction, the piezoelectric material layer between the electrode layers contracts in its lamination direction (piezoelectric longitudinal effect) and expands in its in-plane direction (piezoelectric lateral effect).

If the voltage with a polarity which will induce the contraction or expansion is applied to the piezoelectric element 51b or 52b, the piezoelectric element contracts or expands in response to the applied voltage polarity and thus the movable arm 51 or 52 bends to trace a S-character resulting the top end section of the arm 51 or 52 to laterally and linearly displace. Thus, the magnetic head slider 21 fixed with the actuator 22 also laterally and linearly displaces. Since the slider displaces namely sways with linear motion not swinging or rotational motion, more precise positioning of the magnetic head element can be expected.

It is possible to apply voltages that induce mutually reverse motions may be simultaneously applied to the piezoelectric elements 51b and 52b, respectively. In other words, AC voltages may be simultaneously applied to the piezoelectric elements 51b and 52b so that one piezoelectric element expands when the other piezoelectric element contracts and vice versa. The oscillation of the movable arms is centered when no voltage is applied to the piezoelectric elements. In this case, the amplitude of the oscillation will be nearly double of that when a voltage is alternately applied to each piezoelectric element. However, one of the piezoelectric elements is expanded and therefore the direction of the driving voltage opposes to that of the polarization in the piezoelectric material layer. Thus, if the applied voltage is high or the voltage is continuously applied, attenuation in polarization of the piezoelectric material layer may occur. It is desired therefore that a constant DC bias voltage in the same direction as the polarization direction be additionally applied to the AC voltage to form the driving voltage so that the direction of the driving voltage never opposes to that of the polarization in the piezoelectric material layer. The oscillation of the movable arms is centered when only the bias voltage is applied to the piezoelectric elements.

In this specification, the piezoelectric material is material that expands or contracts by their reverse piezoelectric effect or electrostrictive effect. Any piezoelectric material applicable for the piezoelectric elements of the actuator can be used. However, for high rigidity, it is desired to use a ceramics piezoelectric material such as $PZT[Pb(Zr,Ti)O_3]$, $PT(PbTiO_3)$, $PLZT[(Pb,La)(Zr,Ti)O_3]$, or barium titanate $(BaTiO_3)$.

It is possible to form each piezoelectric element from a laminating structure of a single piezoelectric material layer, a single signal electrode layer and a single ground (common) electrode layer.

As aforementioned, since the base 50 and the movable arms 51 and 52 of the actuator 22 in this embodiment are made from a metal plate, the weight of the whole actuator can be reduced and thus a mechanical resonance frequency of the actuator can be increased.

Also, as the basic member is formed by the metal plate that is strong and light-weighted, a shock resistance of the movable arms 51 and 52 which are particularly weaken for the shock can be greatly improved. Due to the usage of the metal plate provided with a high mechanical strength, treatment of the actuator during assembling of the HGA becomes very easy.

By using the metal plate to form the main portion of the actuator, the flexibility on a design of the actuator will improve with the shape and/or size. Thus, not only it is enabled to design the actuator with a sufficient stroke, but also it is possible to align the center of the magnetic head slider 21 and the load point or dimple position with the center of the actuator 22 resulting the flying performance of the magnetic head slider 21 to be extremely stabilized.

Because the metal plate can be precisely machined, accuracy in size of the actuator 22 itself can be greatly improved.

Furthermore, since the actuator 22 in this embodiment holds the side surfaces of the magnetic head slider 21 so that the slider 21 is caught in a space between the movable arms 51 and 52, the thickness of the HGA around the magnetic head slider does not increase even if the actuator 22 is attached. Thus, no modifications in size of the magnetic disk drive apparatus due to the mounting of the actuator is necessary.

In addition, since the actuator 22 and the magnetic head slider 21 are not stacked to form a cantilever structure, a shock resistance can be greatly improved.

Further, since the magnetic head slider 21 is caught in between the movable arms 51 and 52, the top end sections of the movable arms 51 and 52, which actually transfer the displacement to the slider 21, can be extended to always position at the top end of the slider 21. Thus, it is possible to provide a constant travel to the slider even if the size of the magnetic head slider 21 changes, and therefore an enough stroke of the magnetic head at the precise positioning operation can be always obtained.

Figure 8:
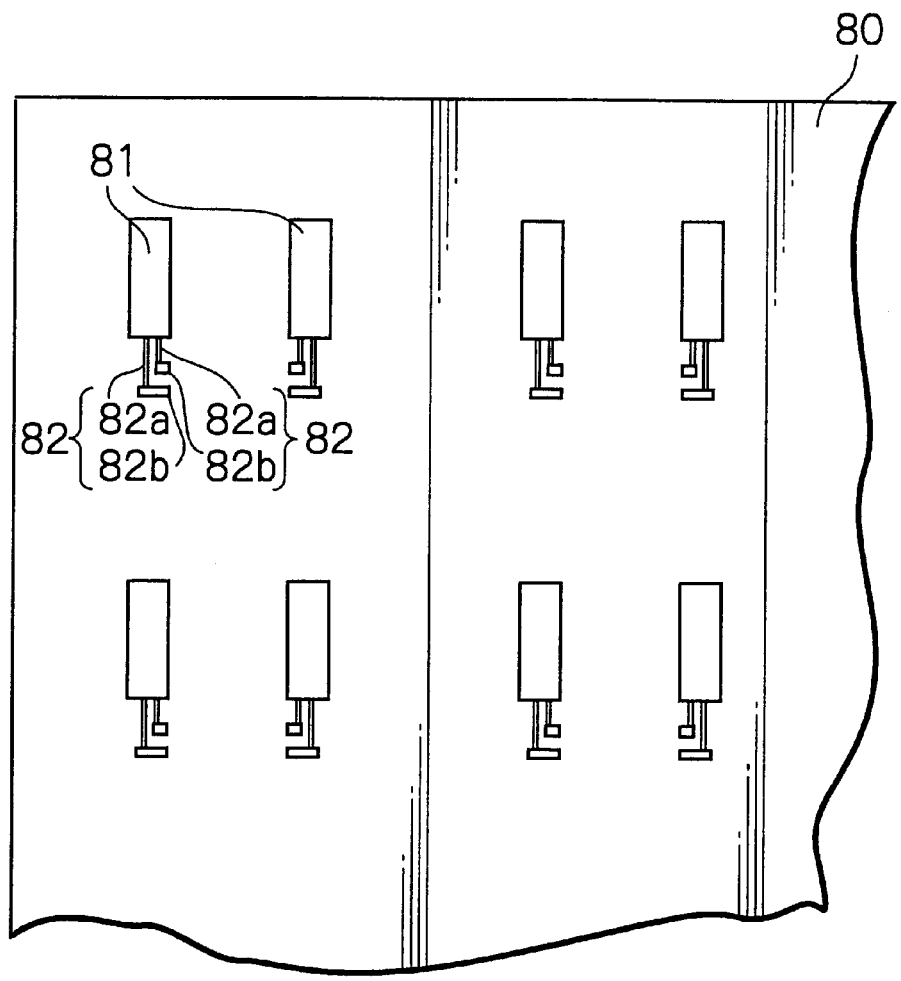
FIG. 8 is a plane view illustrating a part of a manufacturing process of the HGA in the embodiment of FIG. 1.
Figure 9:
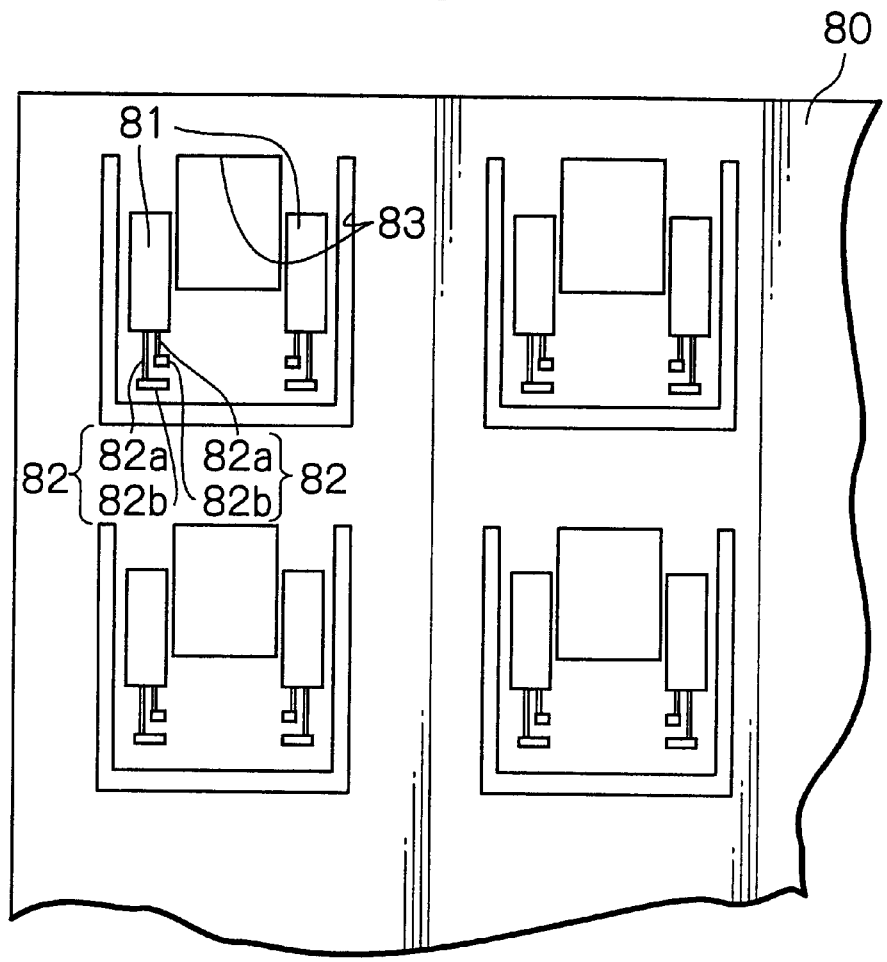
FIG. 9 is a plane view illustrating a part of a manufacturing process of the HGA in the embodiment of FIG. 1.
Figure 10:
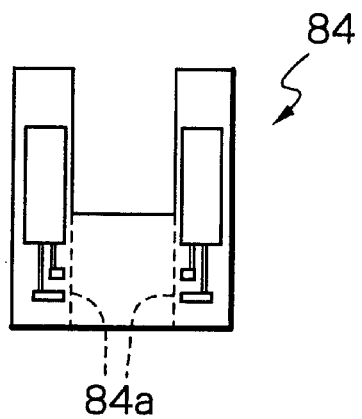
FIG. 10 is a plane view illustrating a part of a manufacturing process of the HGA in the embodiment of FIG. 1.

FIGS. 8 to 10 illustrate parts of a manufacturing process of the HGA in this embodiment. Hereinafter, the manufacturing process of the HGA will be described with reference to these figures.

First, as shown in FIG. 8, many of regions for actuators are set in matrix on a resilient metal plate such as a stainless plate, and then a multilayer structure of piezoelectric elements 81 and conductor patterns 82 consisting of lead conductors 82a electrically connected with the piezoelectric elements 81 and terminal electrodes 82b is formed in each region by sputtering and photolithography. More concretely, in each region, a PZT layer is deposited by sputtering over the whole surface of the metal plate, the deposited PZT layer is patterned by photolithography, a conductor layer is deposited by sputtering over the whole surface, and then the conductor layer is patterned by photolithography to form the conductor patterns 82 consisting of the lead conductors 82a and the terminal electrodes 82b. Thereafter, these processes are repeatedly executed to form the multilayer structure of the piezoelectric element and the conductor patterns. The conductor patterns 82 consisting of the lead conductors 82a and the terminal electrodes 82b are formed by a patterned Cu layer on an insulation layer of resin material such as polyimide. Within the areas of the terminal electrodes 82b, an Au layer is laminated on the Cu layer.

In a modification, piezoelectric elements 81, and a conductor patterns 82 consisting of lead conductors 82a electrically connected with the piezoelectric elements 81 and terminal electrodes 82b may be formed by printing, then this printing process be repeatedly executed to form a multilayer structure and thereafter the formed multilayer structure be sintered.

In another modification, piezoelectric elements 81 individually formed may be adhered on a metal plate 80 and electrically connected with conductor patterns 82 preliminarily formed on the metal plate 80.

Next, as shown in FIG. 9, on the metal plate 80, grooves and openings 83 for cutting the plate are formed by etching along each partition between the regions for actuators. Then, this metal plate 80 is cut along the grooves 83 and thus, as shown in FIG. 10, individually separated actuator members 84 each having a rough U-plane shape are obtained.

Thereafter, each actuator member 84 is bent along broken lines 84a and also the top end sections of its movable arms are bent in a crank shape. Thus, the actuator 22 with a three-dimensional structure shown in FIG. 5 is formed.

In a modification, each actuator member 84 may be cut from the metal plate 80 by press working instead of etching. In this case, bending of the member can be simultaneously performed.

In another modification, the bending of the actuator members may be performed before cutting of the actuator members from the metal plate.

In a further modification, piezoelectric elements 81 individually formed may be adhered on an actuator member 84 cut from the metal plate 80 or on an actuator member 84 after bending, and electrically connected with conductor patterns 82 preliminarily formed on the actuator member 84.

Figure 11:
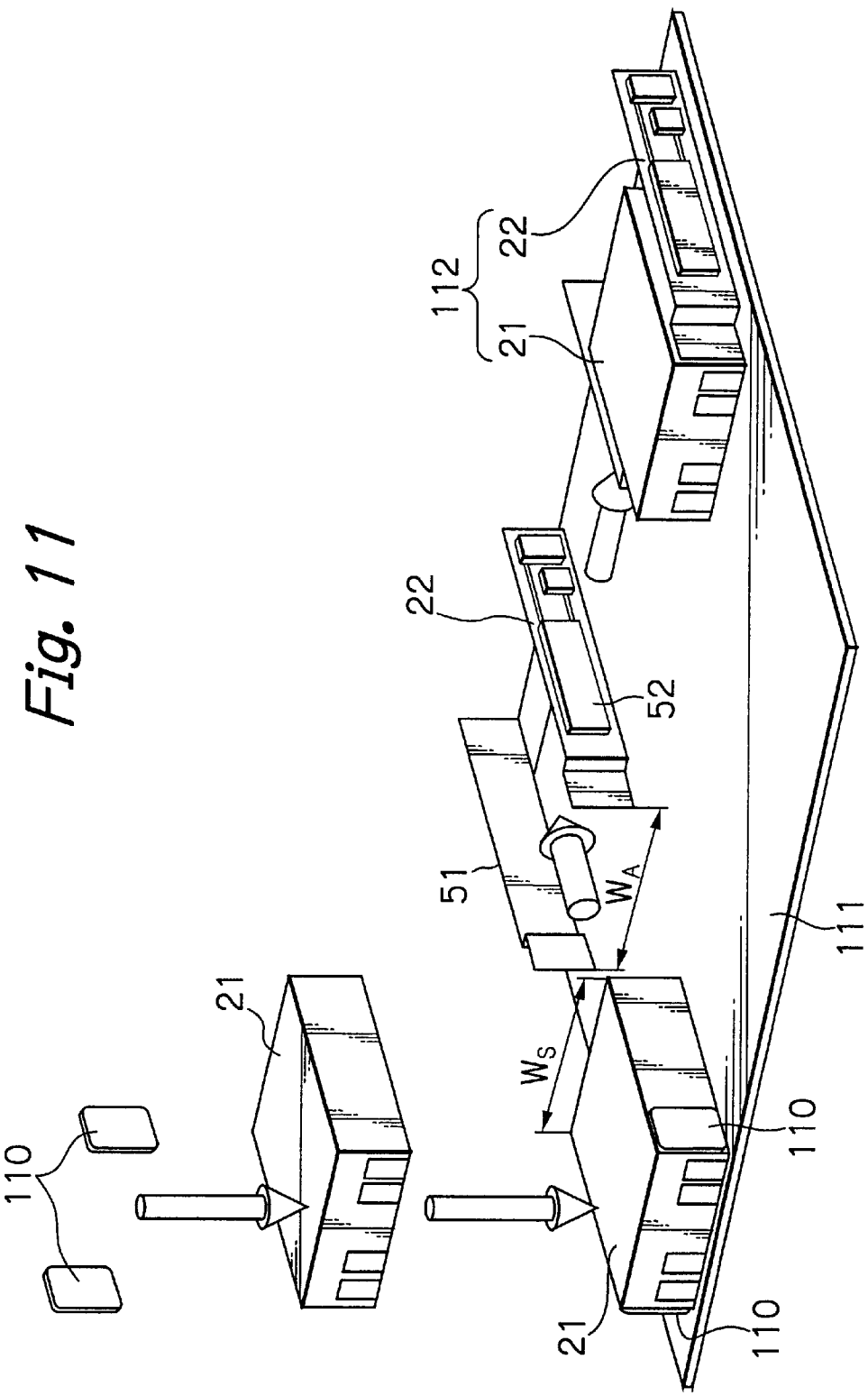
FIG. 11 is an oblique view illustrating a part of a manufacturing process of the HGA in the embodiment of FIG. 1.

FIG. 11 illustrates a part of a manufacturing process of the HGA in this embodiment. As shown in this figure, to assemble the HGA, first, an adhesive 110 such as a thermosetting epoxy resin family adhesive is coated on parts of both side surfaces of the magnetic head slider 21. Then, the slider 21 is disposed on a flat plate 111 and inserted between the movable arms 51 and 52 of the actuator 22 that is also disposed on the flat plate 111.

The spacing $W_A$ between the movable arms 51 and 52 of the actuator 22 is set a little smaller than the width $W_S$ of the magnetic head slider 21. Thus, the magnetic head slider 21 can be provisionally fixed between the movable arms 51 and 52 by a pinching force of these arms without using any holder. Then, by thermally curing the adhesive 110, the slider 21 is securely fixed to the movable arms 51 and 52.

An assembly 112 of the magnetic head slider 21 and the actuator 22 is thus formed.

Since assembling of the magnetic head slider 21 and the actuator 22 can be carried out on the flat plate, alignment of the slider and the actuator becomes easy resulting that a higher accuracy assembling can be expected. Also, since a thermosetting adhesive with excellent curing performance although it needs a long curing time can be used, a high quality assembly 112 of the magnetic head slider 21 and the actuator 22 can be obtained.

Then, the assembly 112 of the magnetic head slider 21 and the actuator 22 is fixed on the flexure 26 of the suspension 20 as shown in FIGS. 3 and 4. More concretely, adhesive is coated on the insulation layer 26b on the tongue 26a of the flexure 26 and on the separated section 26c of the flexure 26, respectively, and the base 22a (50) of the actuator 22 of the assembly 112 and the top end section of the magnetic head slider 21 of the assembly 112 are adhered on the insulation layer 26b and on the separated section 26c, respectively.

In this embodiment, because the actuator 22 is mainly made from a metal plate, the assemble 112 may be directly fixed with the flexure 26 without using adhesive by laser welding the base 22a (50) of the actuator 22 with the tongue 26a of the flexure 22.

Then, the A channel signal terminal 22b and the B channel signal terminal (not shown) of the actuator 22 are electrically connected with the actuator connection pads 31 by soldering or using silver containing epoxy resin. Also, the ground (common) terminal 22d and the ground (common) terminal (not shown) of the actuator 22 are electrically connected with ground (common) connection pads 32 by soldering or using silver containing epoxy resin. If the soldering is used for the connection, connection strength of the assembly 112 with the suspension will increase.

Thereafter, the terminals electrodes 21a of the magnetic head slider 21 are electrically connected to the head element connection pads 29 by Au ball-bonding for example.

Since the assembly 112 has a simple shape, the above-mentioned processes of adhesion and electrical connection of the assembly 112 with the suspension can be performed by using a general HGA assembling equipment resulting the productivity to extremely improve and thus the manufacturing cost to reduce.

The assembling of an HGA may be performed by fixing first an actuator to a suspension, and then by inserting a head slider provided with at least one head element between movable arms of the actuator to attach the slider to the actuator already fixed with the suspension.

In the aforementioned embodiments, the precise positioning actuators for the thin-film magnetic head elements and the HGAs with the actuators are described. However, it is apparent that the present invention can be applied to a precise positioning actuator for a head element such as an optical head element other than the thin-film magnetic head element and an HGA, with the actuator.

Many widely different embodiments of the present invention may be constructed without departing from the spirit and scope of the present invention. It should be understood that the present invention is not limited to the specific embodiments described in the specification, except as defined in the appended claims.

What is claimed is:

1. A precise positioning actuator to be fixed to a head slider provided with at least one head element and to a support, for precisely positioning said at least one head element, said actuator comprising a pair of movable arms and a base connecting a portion of said movable arms and fixed to said support, said movable arms and said base having a U-plane shape formed by a bent single metal plate, said movable arms being capable of displacing in response to a drive signal applied to said actuator along a direction crossing a plate plane of said movable arms, and catching said head slider in a space there between.

2. The actuator as claimed in claim 1, wherein said movable arms have at their top end section slider fixing sections to be fixed to said surfaces of said head slider, respectively.

3. The actuator as claimed in claim 2, wherein each of said slider fixing sections has a structure formed by bending said bent single metal plate inwardly.

4. The actuator as claimed in claim 2, wherein said actuator has a shape so that there exists air gaps between said movable arms and side surfaces of said head slider except for said slider fixing sections, respectively.

5. The actuator as claimed in claim 1, wherein each of said movable arms compromise an arm member made of the bent single metal plate, and a piezoelectric element formed or adhered on a said surface of said arm member.

6. The actuator as claimed in claim 5, wherein said piezoelectric element has a multilayer structure of piezoelectric material layers and of electrode layer.

7. The actuator as claimed in claim 5, wherein said piezoelectric element has a single layer structure of a piezoelectric material layer and of an electrode layer.

8. The actuator as claimed in claim 1, wherein said bent single metal plate is a stainless steel plate.

9. The actuator as claimed in claim 1, wherein said movable arms is constituted so that said head slider is linearly and laterally swayed in response to the drive signal.

10. The actuator as claimed in claim 1, wherein a spacing between said pair of movable arms is determined to a value slightly shorter than a width of said head slider to be caught.

11. The actuator as claimed in claim 1, wherein said at least one head element is at least one thin-film magnetic head element.

12. The actuator as claimed in claim 1, wherein said base connects a single edge of each said movable arms.

13. A head gimbal assembly including a head slider provided with at least one head element, a support and a precise positioning actuator fixed to said head slider and to said support for precisely positioning said at least one head element, said actuator comprising a pair of movable arms and a base connecting a portion of said movable arms and fixed to said support, said movable arms and said base having a U-plane shape formed by a bent single metal plate, said movable arms being capable of displacing in response to a drive signal applied to said actuator along a direction crossing a plate plane of said movable arms, and catching said head slider in a space there between.

14. The head gimbal assembly as claimed in claim 13, wherein said movable arms have at their top end sections slider fixing sections to be fixed to side surfaces of said head slider, respectively.

15. The head gimbal assembly as claimed in claim 14, wherein each of said slider fixing sections has a structure formed by bending said bent single metal plate.

16. The head gimbal assembly as claimed in claim 14, wherein said actuator has a shape so that there exists air gaps between said movable arms and side surfaces of said head slider except for said slider fixing sections, respectively.

17. The head gimbal assembly as claimed in claim 13, wherein each of said movable arms comprises an arm member made of the bent single metal plate, and a piezoelectric element formed or adhered on a side surface of said arm member.

18. The head gimbal assembly as claimed in claim 17, wherein said piezoelectric element has a multilayer structure of piezoelectric material layers and of electrode layers.

19. The head gimbal assembly as claimed in claim 17, wherein said piezoelectric element has a single layer structure of a piezoelectric material layer and of an electrode layer.

20. The head gimbal assembly as claimed in claim 13, wherein said bent single metal plate is a stainless steel plate.

21. The head gimbal assembly as claimed in claim 13, wherein said movable arms is constituted so that said head slider is linearly and laterally swayed in response to the drive signal.

22. The head gimbal assembly as claimed in claim 13, wherein a spacing between said pair of movable arms is determined to a value slightly shorter than a width of said head slider to be caught.

23. The head gimbal assembly as claimed in claim 13, wherein said at least one head element is at least one thin-film magnetic head element.

24. The head gimbal assembly as claimed in claim 13, wherein said movable arms of said actuator and said head slider are fixed by adhering.

25. The head gimbal assembly as claimed in claim 13, wherein said actuator and said support are fixed by adhering or by laser welding.

26. The head gimbal assembly as claimed in claim 13, wherein said base connects a single edge of each said movable arms.

27. A disk drive apparatus having at least one head gimbal assembly that includes a head slider with at least one head element, a support and a precise positioning actuator fixed to said head slider and to said support for precisely positioning said at least one head element, said actuator comprising a pair of movable arms and a base connecting a portion of said movable arms and fixed to said support, said movable arms and said base having a U-plane shape formed by a bent single metal plate, said movable arms being capable of displacing in response to a drive signal applied to said actuator along a direction crossing a plate plane of said bent single metal plate, and catching said head slider in a space there between.

28. The disk drive apparatus as claimed in claim 27, wherein said base connects a single edge of each said movable arms.

* * * * *